N. B. LUCAS.
Thrashing Machine.
No. 9,825.
2 Sheets—Sheet 1.
Patented June 28, 1853.
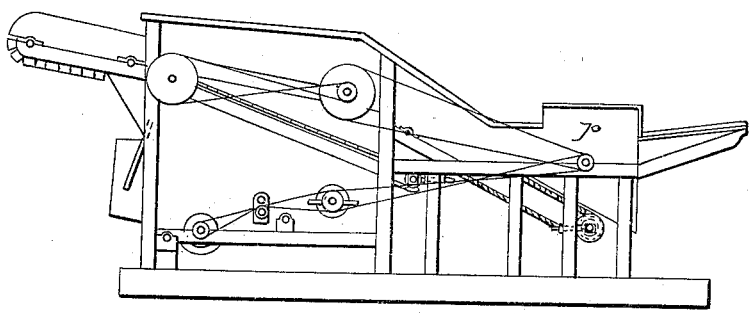
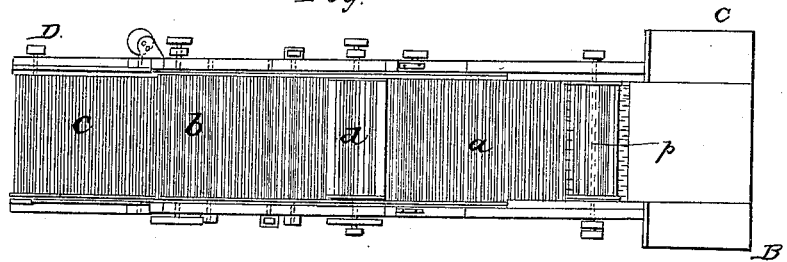
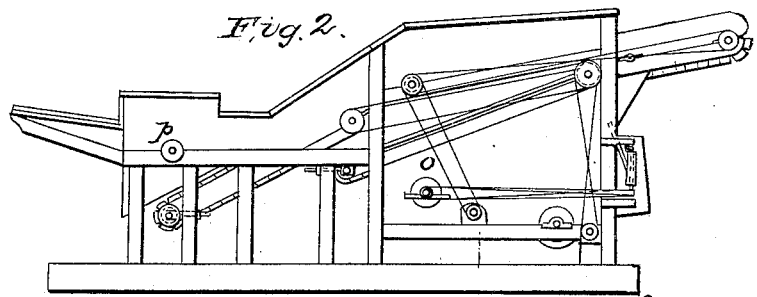
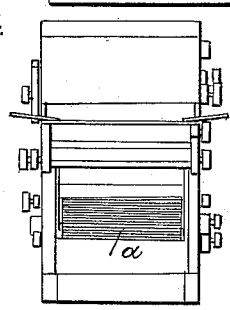 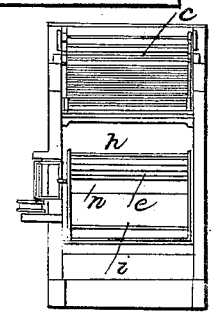

N. B. LUCAS.
Thrashing Machine.
No. 9,825.
2 Sheets—Sheet 2.
Patented June 28, 1853.
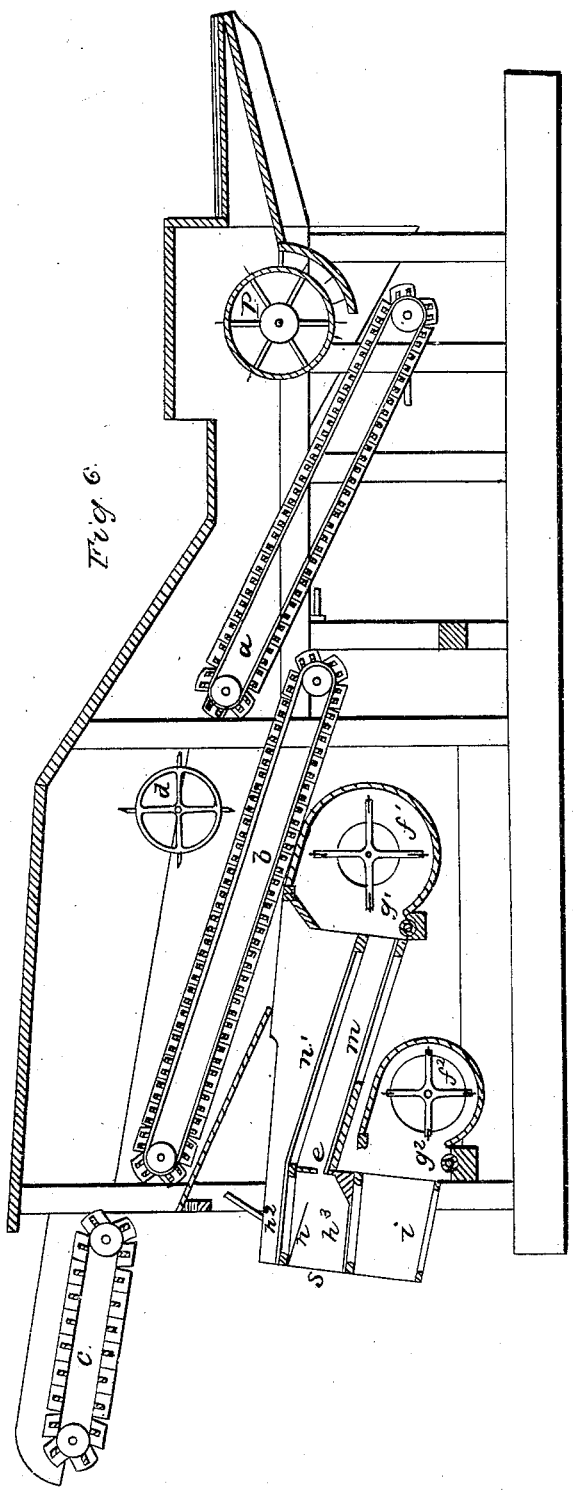
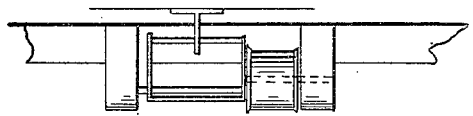
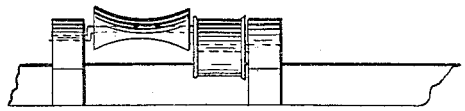

UNITED STATES PATENT OFFICE.

NAPOLEON B. LUCAS, OF OTTER CREEK, ILLINOIS.

THRESHER AND SEPARATOR OF GRAIN.

Specification of Letters Patent No. 9,825, dated June 28, 1853.

*To all whom it may concern:*

Be it known that I, N. B. LUCAS, of Otter Creek, in the county of Jersey and State of Illinois, have invented a new and Improved Machine for Separating and Cleaning Grain; and I do hereby declare that the following is a full and exact description thereof, reference being had to the accompanying drawing, making part of this specification, in which—

Figures 1 and 2, are side elevations of my machine, combined with a thresher; Fig. 3, a top view of the same; Figs. 4 and 5, end elevations; Fig. 6, a longitudinal vertical section through the center; and Figs. 7 and 8, views of detached parts.

Like letters refer to like parts in all the figures.

The grain, straw, &c., are conducted from the thresher $p$, by the endless platform $a$, thence carried along by the endless platform $b$, while a cylinder, or beater, $d$, revolves just above it, and separates the straw, if matted or damp, and shakes the grain from it, into the cavities, which I usually make on the surface of the endless platform. When the straw, grain &c. have arrived at the upper end of the endless platform $b$, the straw is carried off by the endless platform $c$, which is placed at some distance from the platform $b$, in order that any grain which may still be in the straw may fall out, but revolves with greater velocity, so as to effectually carry the straw away, while the grain and chaff fall upon the sieve $h^{-1}$. The grain is cleaned as it falls through said sieve by the strong blast from the fan $f^{-1}$, and conducted by the inclined plane $m$, into the receiving box $g^{-1}$. The blast produced by the fan $f^{-1}$, is divided so that a portion passes into the space between the inclined plane $m$, and the sieve $h^{-1}$, and being arrested by the adjustable partition $e$, rises perpendicularly up through said sieve $h^{-1}$, lifting the chaff and impurities from the sieve, while the main portion of the blast, produced by the same fan, blows the chaff, &c. away over the sieve $h^{-2}$, where the light grain which is borne along by the blast lodges and falls through upon the inclined plane $n$, thence upon the sieve $h^{-3}$, thence through said sieve upon the inclined plane $i$, and by it conducted into the receiving box $g^{-2}$. A portoin of the blast from the fan $f^{-1}$, may be admitted through upon this grain by the adjustable partition $e$, so regulated as not to blow away the light grain as it falls, but to remove garlic or other impurities, which may be mixed with it. And the more gentle blast from the second fan $f^{-2}$, completely cleans the said light grain. The receiving boxes $g^{-1}$ and $g^{-2}$, are emptied by a spiral shaft in the same, which is put in motion, when required, by running a belt upon it.

By the above described arrangement, I am enabled to separate the light grain from the sound grain; at the same time cleaning and saving this inferior grain by the same operation, in which I clean the sound grain; a matter of much importance, especially in seasons when the grain is blighted.

What I claim as my invention and desire to secure by Letters Patent, is—

The auxiliary screen $h^2$, placed in a horizontal position, or nearly so, and projecting from the rear end of the inclined screen $h^1$, so as to be out of the axis of the blast over the said screen $h^1$, for the purpose of catching and saving the blighted and lighter kernels of grain which may be blown beyond the rear extremity of the said inclined screen $h^1$, substantially as herein set forth.

The above specification of my improved machine for separating and cleaning grain signed by me this 21st day of January 1852.

N. B. LUCAS.

Witnesses:
B. B. HAMILTON,
DANIEL T. LAMB.